(12) United States Patent
Nagai (10) Patent No.: US 7,528,699 B2
(45) Date of Patent: May 5, 2009

(54) TRANSPONDER IN COMMUNICATION SYSTEM

(75) Inventor: Takuya Nagai, Nagoya (JP)

(73) Assignee: Brother Kogyo Kabushiki Kaisha, Tokyo (JP)

( * ) Notice: Subject to any disclaimer, the term of this patent is extended or adjusted under 35 U.S.C. 154(b) by 289 days.

(21) Appl. No.: 11/032,197

(22) Filed: Jan. 11, 2005

(65) Prior Publication Data

US 2005/0134434 A1 Jun. 23, 2005

Related U.S. Application Data

(63) Continuation-in-part of application No. PCT/JP03/10400, filed on Aug. 18, 2003.

(30) Foreign Application Priority Data

Aug. 19, 2002 (JP) .............................. 2002-238430

(51) Int. Cl.
*H04Q 5/22* (2006.01)
(52) U.S. Cl. .................................... 340/10.4
(58) Field of Classification Search ................ 340/10.4, 340/10.1, 10.2, 572, 10.33; 455/215
See application file for complete search history.

(56) References Cited

U.S. PATENT DOCUMENTS

| 5,701,121 | A | * | 12/1997 | Murdoch | .................. | 340/10.34 |
| 6,054,925 | A | | 4/2000 | Proctor et al. | | |
| 6,177,861 | B1 | | 1/2001 | MacLellan et al. | | |
| 6,281,794 | B1 | * | 8/2001 | Duan et al. | ............... | 340/572.1 |
| 6,721,289 | B1 | * | 4/2004 | O'Toole et al. | ............. | 370/311 |
| 6,867,687 | B2 | * | 3/2005 | Turner | ....................... | 340/10.2 |

FOREIGN PATENT DOCUMENTS

| JP | A-03-221890 | 9/1991 |
| JP | A-04-505654 | 10/1992 |
| JP | A-07-020238 | 1/1995 |
| JP | A-07-131403 | 5/1995 |
| JP | A-08-094745 | 4/1996 |
| JP | B2-2628892 | 4/1997 |
| JP | B2-2705076 | 10/1997 |
| JP | A-11-174148 | 7/1999 |
| JP | A-2000-049656 | 2/2000 |
| WO | WO 90/09707 A1 | 8/1990 |

* cited by examiner

*Primary Examiner*—Brian A Zimmerman
*Assistant Examiner*—Nabil H Syed
(74) *Attorney, Agent, or Firm*—Oliff & Berridge, PLC (57) ABSTRACT

A transponder of a communication system, which has a high modulation factor for stable communication, and wherein an impedance element in the form of a coil is connected to an antenna of the transponder, and a resistor and a switching element in the form of a diode a high-frequency wave of which is grounded are connected to the coil. The antenna is a monopole antenna having a low impedance, and the coil has an inductance of 10 nH. Application of an electric current of 100 mA to the diode causes a phase difference of 122 degrees and an amplitude ratio of 1.1 with respect to a phase when the electric current is not applied to the diode.

12 Claims, 10 Drawing Sheets

TRANSPONDER IN COMMUNICATION SYSTEM

This is a Continuation-in-Part of International Application No. PCT/JP03/010400 filed Aug. 18, 2003, which claims the benefit of Japanese Patent Application No. 2002-238430 filed Aug. 19, 2002. The entire disclosure of the prior applications is hereby incorporated by reference herein in its entirety.

BACKGROUND OF THE INVENTION

1. Field of the Invention

The present invention relates to a transponder of a communication system wherein an interrogator transmits a main carrier, and each transponder which has received the main carrier responds to the interrogator with a reflected wave which is generated by modulating the main carrier in a predetermined manner.

2. Discussion of Related Art

There is known a radio communication system as disclosed in JP-2000-49656A, wherein an interrogator transmits a main carrier to a plurality of transponders, and each transponder which has received the main carrier reflects the main carrier, by modulating the main carrier with appropriate information signal such as an identification signal identifying the transponder, or a subcarrier which has been modulated with such information signal. JP-2705076B2 discloses an example of the transponder used in this type of communication system, which has a high-frequency circuit incorporating an antenna, a quarter-wave line or stub, and a switching element. JP-7-20238A discloses another example of the transponder wherein a matching circuit is provided between the switching element and the antenna, in order to reduce an influence of the impedance of the antenna. In this type of communication system, it is considered to utilize a phase modulation which has a small variation in the modulation factor due to positional variation. JP-3-221890 discloses the use of diodes as the switching elements to generate a modulated signal, and other techniques relating to only the impedance of a load circuit, such as a change in the length of a stub, and selective opening and shorting of the load circuit.

SUMMARY OF THE INVENTION

In the techniques indicated above, an influence of the input impedance of the antenna is not at all taken into consideration, so that the prior art suffers from problems such as insufficiency of the phase variation, generation of an unnecessary amplitude-modulated component, and offsetting of the amplitude-modulated component and a phase-modulated component with each other upon demodulation of the modulated signal, which lead to reduction of the effective modulation factor. Where the transponder uses an antenna, a quarter-wave circuit and a switching element, the impedance of the switching element must be taken into consideration, and the actual phase variation of the reflected electric field is smaller than the nominal value. This is true also where the load circuit is selectively opened and shorted. Even where the diode is used as the switching element, the impedance of the antenna is not taken into consideration, so that the amount of phase variation is undesirably smaller than required. Where the length of the stub or line is changed, two switching elements must be used, so that the circuit tends to be complicated and requires an increased amount of consumption of an electric current, and suffers from a problem of shifting of the reference phase due to the impedance of the antenna, resulting in an amplitude variation. Those techniques do not take account of the amplitude variation of the reflected electric field upon modulation, and suffer from a problem of instability of communication due to the amplitude variation.

The present invention was made in an attempt to solve the problems described above. It is an object of the present invention to provide a transponder in a communication system, which transponder permits an increased actual modulation factor, a reduced amplitude variation, and increased stability of communication, irrespective of the type of an antenna used by the transponder.

The object indicated above may be achieved by a transponder of a communication system, according to the principle of the present invention, wherein an interrogator transmits a main carrier, and the transponder receives the main carrier through an antenna, and effects a predetermined modulation of the main carrier by changing an impedance of a circuit connected to the antenna, as viewed from the antenna, to generate a reflected wave for responding to the interrogator, the transponder being characterized in that the circuit is provided with a switching element operable to modulate the main carrier received by the antenna, and an impedance element connected to the switching element, and the impedance element has an impedance determined so as to provide a predetermined difference between a phase of a total impedance which is a sum of an input impedance of the antenna and an impedance of the circuit, at a frequency of the main carrier, when the switching element is in an on state, and that when the switching element is in an off state.

In the transponder of the communication system, which is constructed as described above, the main carrier transmitted from the interrogator is received by the antenna, and is subjected to the predetermined modulation, with the switching element being turned on and off to thereby change the impedance of the impedance of the circuit connected to the antenna, as viewed from the antenna, to generate the reflected wave to be transmitted to the interrogator. The reflected wave has a predetermined amount of variation of its phase, which is equal to a difference between the phase of the total impedance of the input impedance of the antenna and the impedance of the circuit at the frequency of the main carrier, when the switching element is in the on state, and that when the switching element is in the off state.

The transponder of the communication system according to a first preferred form of the invention is characterized by not only the arrangement described above, but also an arrangement wherein an amount of an electric current to be applied to the switching element is determined such that an absolute value of the total impedance of the input impedance of the antenna and the impedance of the circuit connected to the antenna at the frequency of the main carrier when the switching element is in the on state is substantially equal to that when the switching element is in the off state.

The absolute value of the difference between the total impedance when the switching element is in the on state and that when the switching element is in the off state is preferably not higher than 30%, and more preferably not higher than 20% or 10% of the total impedance when the switching element is in the off state. Most preferably, the absolute value of the difference is 0% of the total impedance when the switching element is in the off state, that is, the absolute values of the total impedance when the switching element is in the on and off states are equal to each other.

The transponder of the communication system arranged as described above has not only the advantage described above, but also an advantage that the amplitude-modulated component when the switching element is turned on and off can be reduced to minimize an amount of reduction of a detected signal level of the reflected wave due to the amplitude-modulated component, upon demodulation of the reflected wave by the interrogator.

The transponder of the communication system according to a second preferred form of this invention is characterized by not only the arrangement described above, but also an arrangement wherein the antenna has an impedance including a resistance component which is smaller than a total reactance component of the total impedance of the input impedance of the antenna and the impedance of the above-indicated circuit at the frequency of the main carrier.

The transponder of the communication system arranged as described above has not only the advantage described above, but also an advantage that an amount of phase variation of the reflected wave can be increased.

The transponder of the communication system according to a third preferred form of this invention is characterized by not only the arrangement described above, but also an arrangement wherein the impedance of the impedance element is determined so as to provide a difference of 90 degrees or higher between the phase of the total impedance of the input impedance of the antenna and the impedance of the above-indicated circuit at the frequency of the main carrier when the switching element is in the on state, and that when the switching element is in the off state.

The phase difference of the total impedance of the input impedance of the antenna and the impedance of the above-indicated circuit at the frequency of the main carrier (more precisely, the absolute value of the phase difference) is preferably 90 degrees or higher, more preferably 100 or 110 degrees or higher.

The transponder of the communication system arranged as described above has not only the advantage described above, but also an advantage that the amount of variation of the phase of the reflected wave when the switching element is in the on state, with respect to the phase when the switching element is in the off state can be made 90 degrees or higher.

The transponder according to a fourth preferred form of the invention is characterized by not only the arrangement described above, but also an arrangement wherein the impedance of the impedance element is determined so as to maximize a difference between the phase of the total impedance of the input impedance of the antenna and the impedance of the above-indicated circuit at the frequency of the main carrier when the switching element is in the on state, and that when the switching element is in the off state.

The transponder of the communication system arranged as described above has not only an advantage described above, but also an advantage that the amount of variation of the phase of the reflected wave when the switching element is in the on state with respect to the phase when the switching element is in the off state can be maximized.

The transponder of the communication system according to a fifth preferred form of the invention is characterized by not only the arrangement described above, but also an arrangement wherein a diode is used as the switching element, and an amount of an electric current to be applied to the impedance element and the diode is determined so as to provide a difference of 90 degrees or higher between the phase of the total impedance of the input impedance of the antenna and the impedance of the circuit at the frequency of the main carrier when the electric current is applied to the diode and that when the electric current is not applied to the diode.

The phase difference of the total impedance of the input impedance of the antenna and the impedance of the above-indicated circuit at the frequency of the main carrier (more precisely, the absolute value of the phase difference) is preferably 90 degrees or higher, more preferably 100 or 110 degrees or higher.

The transponder of the communication system arranged as described above has not only the advantage described above, but also an advantage that the amount of variation of the phase of the reflected wave when the electric current is applied to the diode with respect to the phase when the electric current is not applied to the diode can be made 90 degrees or higher.

The transponder of the communication system according to a sixth preferred form of the invention is characterized by the arrangement described above, but also an arrangement wherein a diode is used as the switching element, and an amount of an electric current to be applied to the impedance element and the diode is determined so as to maximize a difference between the phase of the total impedance of the input impedance of said antenna and the impedance of the above-indicated circuit at the frequency of the main carrier when the electric current is applied to the diode and that when the electric current is not applied to the diode.

The transponder of the communication system arranged as described above has not only the advantage described above, but also an advantage that the amount of variation of the phase of the reflected wave when the electric current is applied to the diode with respect to the phase when the electric current is not applied to the diode can be maximized.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
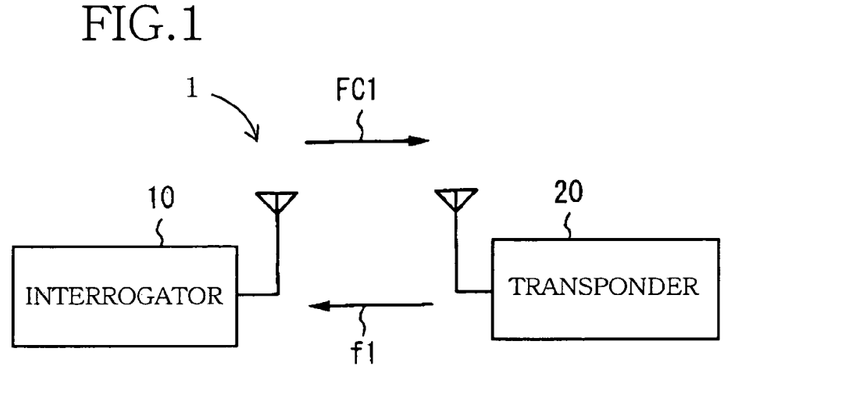
FIG. 1 is a view showing one example of an arrangement of a communication system 1.
Figure 2:
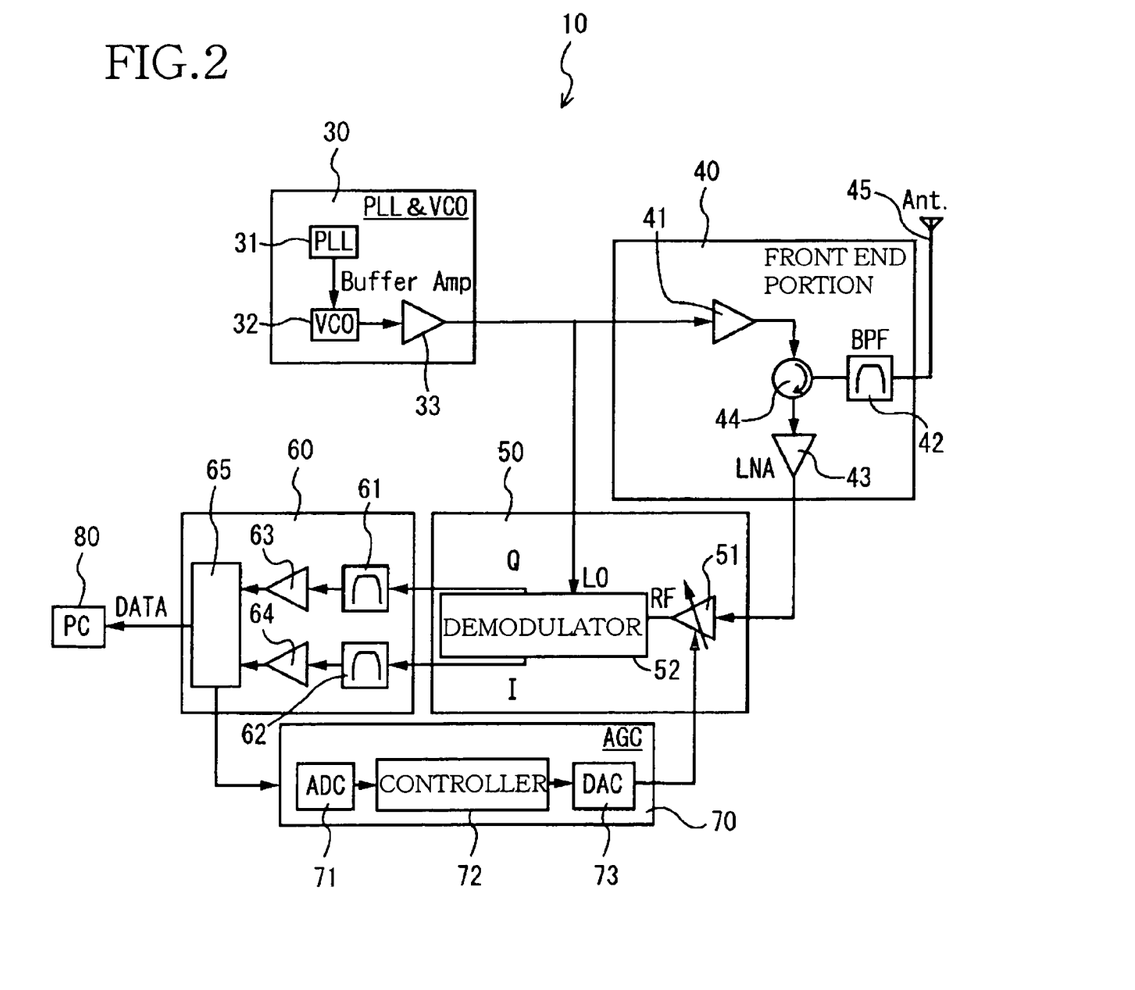
FIG. 2 is a block diagram of an interrogator 10.
Figure 3:
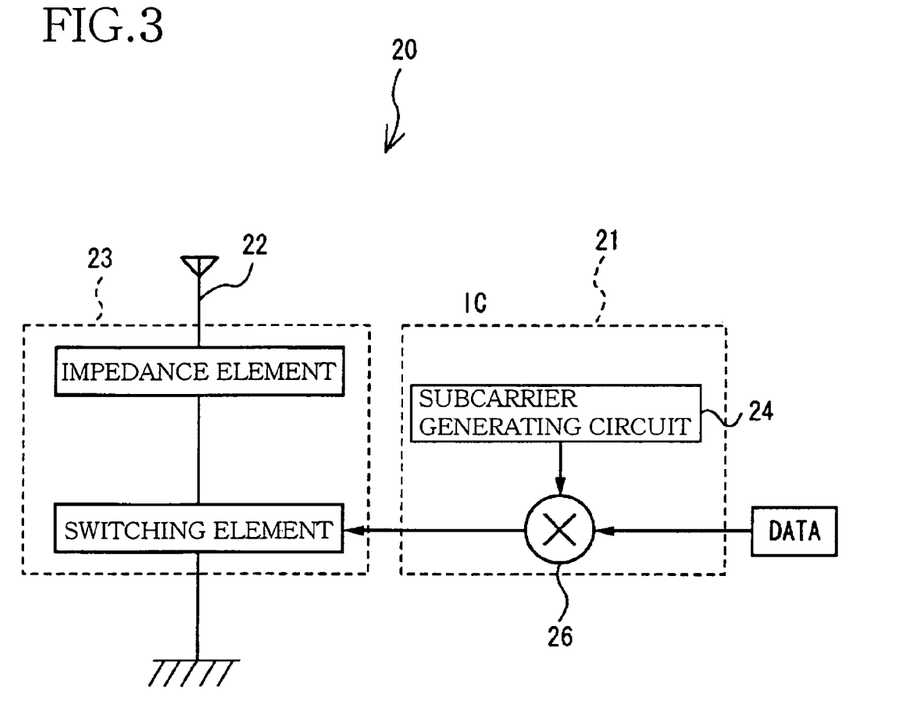
FIG. 3 is a block diagram of a transponder 20.

Referring to the drawings, there will be described one embodiment of a communication system of this invention. FIG. 1 is an overall view showing one example of the communication system 1, and FIG. 2 is a block diagram of an interrogator 10 used in the communication system 1, while FIG. 3 is a block diagram of a passive transponder 20 used in the communication system 1.

As shown in FIG. 1, the communication system 1 is constituted by the interrogator 10 and the transponder 20, for example. The interrogator 10 is arranged to transmit a main carrier FC1, and the transponder 20 is arranged to transmit a reflected wave f1 in response to the received main carrier FC1, so that the interrogator 10 receives the reflected wave FC1. The transponder 20 effects secondary modulation of the received main carrier with a subcarrier signal subjected to primary modulation with an information signal (DATA), to generate the phase-modulated reflected signal f1 to be transmitted to the interrogator 10.

An electrical arrangement of the interrogator 10 will then be described by reference to FIG. 2. As shown in FIG. 2, the interrogator 10 is constituted by: an oscillator circuit 30 arranged to generate a main carrier having a frequency of 900 MHz, 2.4 GHz or 5 GHz, for instance; a front end portion 40 arranged to amplify the main carrier generated by the oscillator circuit 30, and to receive the reflected wave from the transponder 20; a direct conversion circuit portion 50 arranged to effect homodyne detection of the reflected wave received and amplified by the front end portion 40; a demodulator circuit 60 arranged to extract a data signal from the reflected wave detected by the direct conversion circuit portion 50, and to apply the data signal to a personal computer (PC) 80; and an AGC circuit 70 arranged to control a high-frequency amplification gain of the direct conversion circuit portion 50.

The oscillator circuit 30 is constituted by a PLL (Phase Lock Loop) circuit 31, a VCO (Voltage Controlled Oscillator) 32, and a buffer amplifier 33. The front end portion 40 is provided with: a power amplifier 41 arranged to power-amplify the main carrier; a band pass filter 42 arranged to pass only a predetermined band of an electromagnetic wave received and transmitted by an antenna 45; a low-noise amplifier (hereinafter abbreviated as "LNA") 43 arranged to high-frequency amplify the electric wave received by the antenna 45; and a circulator 44 arranged to control its inputs and outputs such that an output of the power amplifier 41 is transferred to the antenna 45, while the electric wave received from the antenna 45 is transferred to the LNA 43.

The direct conversion circuit portion 50 is constituted by a demodulator 52 arranged to effect homodyne detection of a high-frequency wave received from the LNA 43, and a gain controller 51 arranged to control an input from the LNA 43. The demodulator 52 is arranged to output a phase component I and a DC/AC phase component Q. The demodulator circuit 60 is constituted by: band dividing filters 61, 62 arranged to effect filtering operations to separate the subcarrier signal into channels corresponding to hopping frequencies; base band amplifiers 63, 64; and a demodulator 65 arranged to demodulate the subcarrier signal separated by the band dividing filters 61, 62 and amplified by the base band amplifiers 63, 64, to obtain the original information signal, and to apply the information signal to the personal computer 80. The AGC circuit 70 is constituted by an analog/digital converter 71, a gain controller 72, and a digital/analog converter 73.

Next, an electrical arrangement of the transponder 20 will be described by reference to FIG. 3. As shown in FIG. 3, the transponder 20 is constituted by a one-chip IC 21, an antenna 22, an impedance element and a switching element. The one-chip IC 21 is constituted by a subcarrier generating circuit 24 and a mixer 26.

Figure 4:
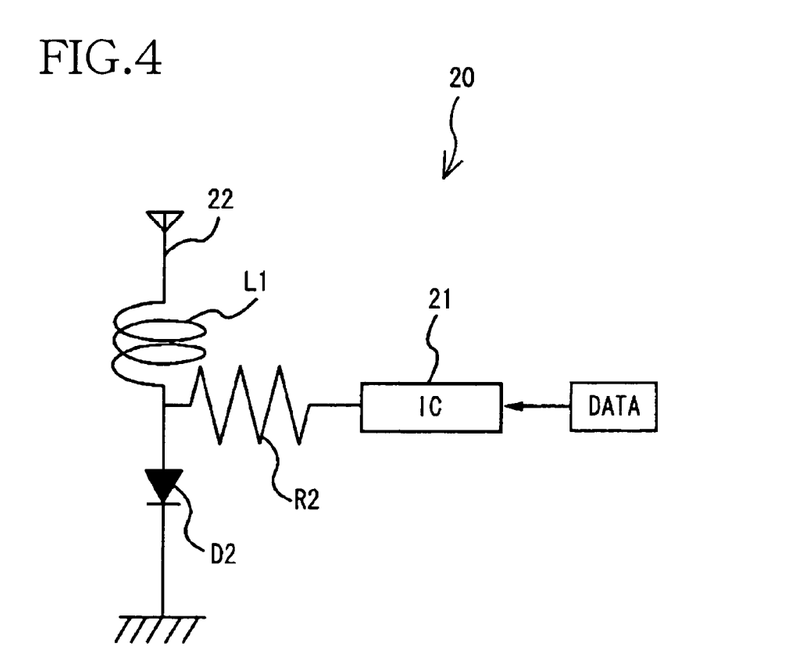
FIG. 4 is a circuit diagram of the transponder 20.

Referring next to FIG. 4, the circuit of the transponder 20 will be explained in detail. FIG. 4 is a circuit diagram showing one example of the circuit of the transponder 20. As shown in FIG. 4, the antenna 22 is connected to the impedance element in the form of a coil L1 to which a resistor R2 and the switching element in the form of a diode D2 are connected such that the resistor R2 and the diode D2 are connected in parallel with each other. The resistor R2 is connected to the one-chip IC 21. The signal modulated with the subcarrier signal is applied to the diode D2 through the resistor R2.

The antenna 22, which preferably has a low degree of impedance, is a monopole antenna. The antenna having a low degree of impedance is preferable since a relatively large amount of electric current can flow through the antenna, so that the reflected wave has a relatively high intensity. However, the antenna 22 may be of any one of the following types other than the monopole type; a dipole antenna; a plane antenna; a circular-polarization complex line loop antenna; an element antenna consisting of a plurality of elements connected in parallel with each other; an inductive antenna; a capacitive antenna; and a monopole antenna of bent type.

Figure 11:
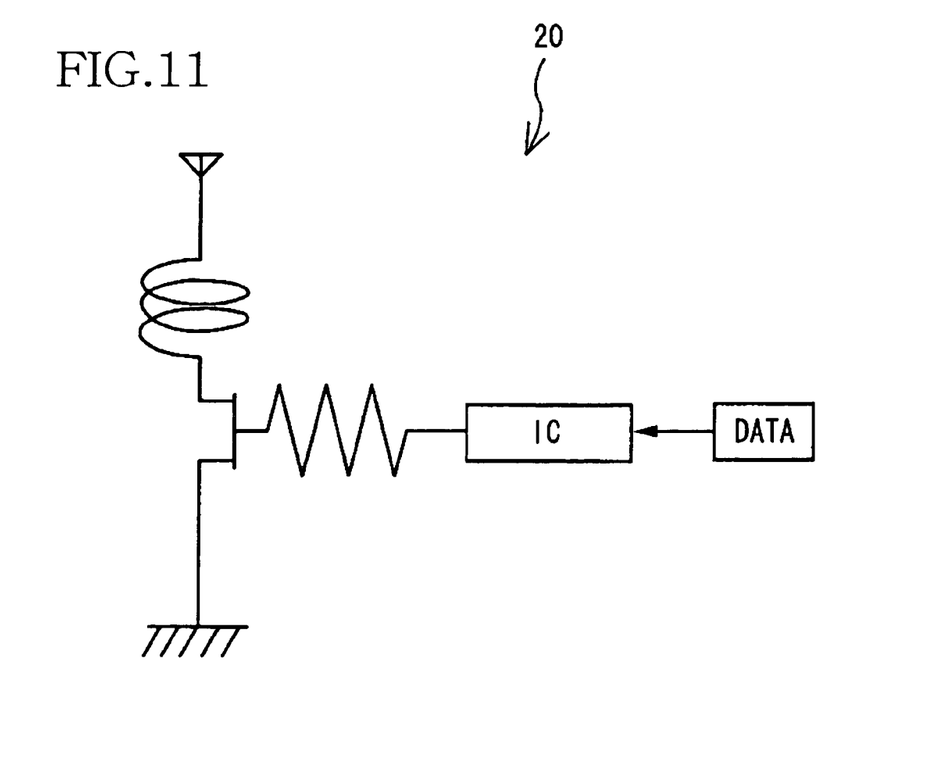
FIG. 11 is a graph showing an example of the transponder 20 which includes a switching element in the form of a field-effect transistor.
Figure 12:
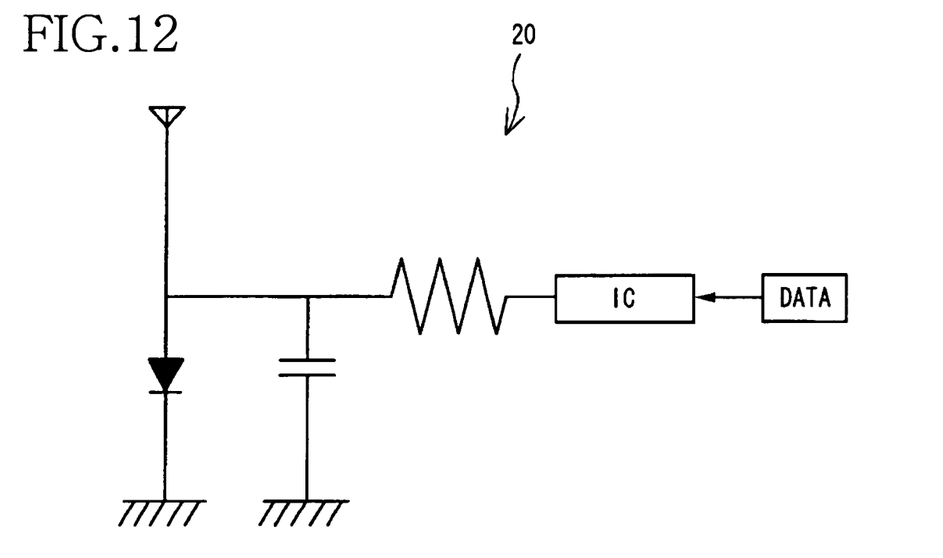
FIG. 12 is a graph showing an example of the transponder 20 which includes a switching element in the form of a diode, and an impedance element in the form of a capacitor, which are connected in parallel with each other.
Figure 13:
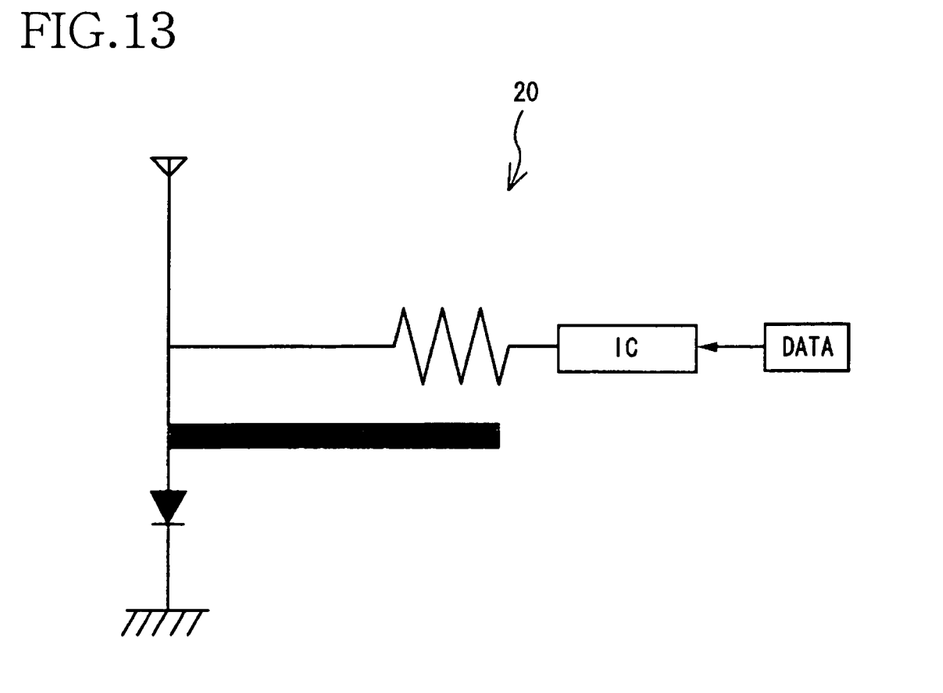
FIG. 13 is a graph showing an example of the transponder 20 which includes a switching element in the form of a diode, and an impedance element in the form of a stub (line)
Figure 14:
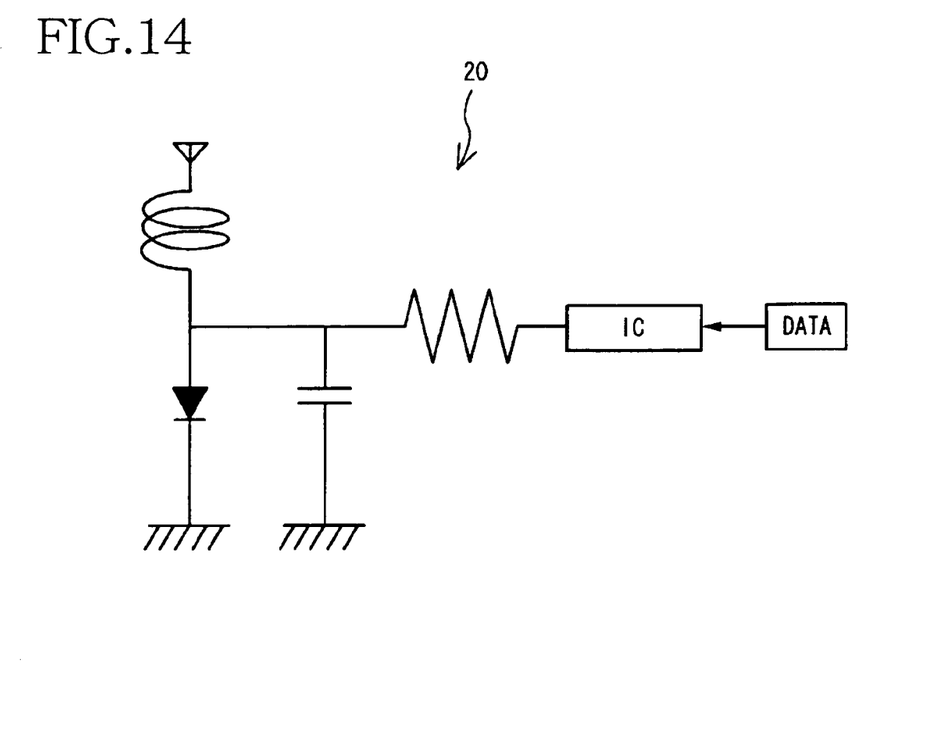
FIG. 14 is a graph showing an example of the transponder 20 which includes a switching element in the form of a diode, and impedance elements in the form of a coil connected in series with the switching element and a capacitor connected in parallel with the switching element.

The switching element may be an element other than the diode D2, for instance, a transistor as shown in FIG. 12, or a field-effect transistor as shown in FIG. 11. The impedance element may be an element other than the coil L1, for instance, a capacitive load such as a capacitor as shown in FIG. 12, or a distributed-constant circuit using a stub or line. Alternatively, a combination of such impedance elements may be used, as shown in FIG. 14. The impedance element may be connected either in series or parallel with the switching element.

In the transponder 20 of the present embodiment constructed as described above, a difference between a phase when an electric current is applied to the diode D2 and that when the electric current is not applied to the diode D2 is expressed as:

$$\angle(1/(Za+Zl+Zd\text{-on})) - \angle(1/(Za+Zl+Zd\text{-off}))$$

wherein, Za: input impedance of the antenna 22
Zl: impedance of the impedance element in the form of the coil L1
Zd-on: impedance of the diode D2 when the electric current is applied thereto
Zd-off: impedance of the diode D2 when the electric current is not applied thereto The absolute value of the phase difference is expressed as:

$$|\angle(1/(Za+Zl+Zd\text{-on})) - \angle(1/(Za+Zl+Zd\text{-off}))|$$

The impedance of the impedance element such as the coil L1 and the amount of electric current to be applied to the switching element such as the diode are determined such that the absolute value of the phase difference is larger than 90 degrees. Once the values Za, Zd-on and Zd-off have been determined, the required impedance Zl of the coil L1 can be obtained, and the inductance of the coil L1 can be determined on the basis of the obtained impedance Zl. The coil L1 (inductor) having the thus determined inductance is connected to the antenna 22. Conventionally, the impedance Za is not taken into consideration, so that the actual phase variation may be smaller than the nominal value, or an unnecessary amplitude modulation component is generated.

The amount of electric current to be applied to the switching element in the form of the diode D2 is determined such that the absolute value of a total impedance (Za+Zl+Zd-off) which is a sum of the impedance of the antenna 22, the impedance of the diode D2 and the impedance of the impedance element in the form of the coil L1 when the electric current is not flowing through the diode D2 is equal to the absolute value of the total impedance (Za+Zl+Zd-on) when the electric current is flowing through the diode D2. Accordingly, the amplitude modulation component is reduced, to prevent an adverse influence of the amplitude modulation component upon demodulation of the phase-modulated signal. In the present transponder 20 wherein the diode D2 is a 1SS307 element, and the coil L1 has an inductance of 10 nH, the resistance of the resistor R2 is selected so that the electric current of 100 μA flows through the diode D2. The main carrier has a frequency of 915 MHz, while the subcarrier has a frequency of 32.768 kHz.

Figure 15:
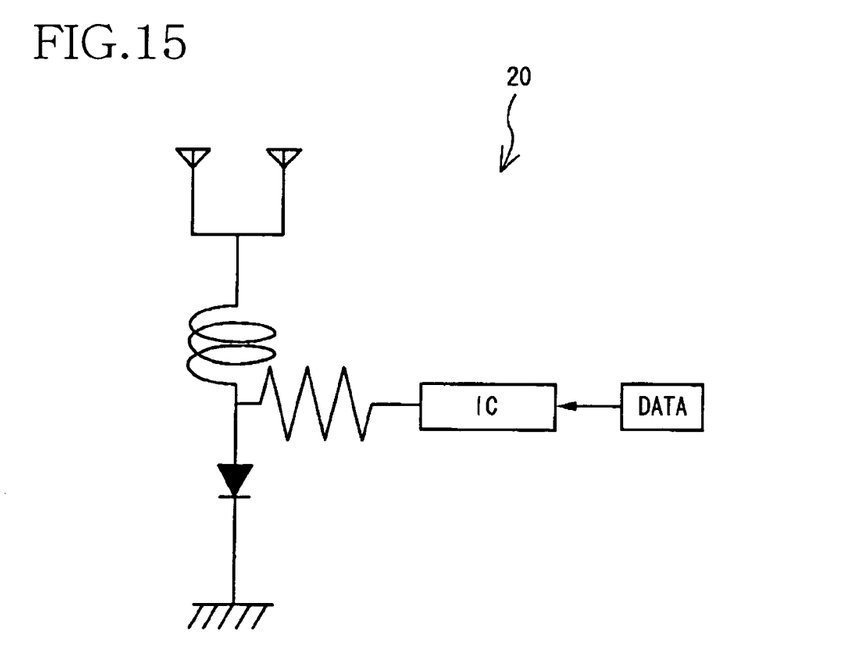
FIG. 15 is a graph showing an example of the transponder 20 which includes a switching element in the form of a diode, an impedance element in the form of a coil, and two antennas connected in parallel with each other.

The amount of electric current to be applied to the diode D2 is set such that a resistance component of the impedance of the antenna 22 is smaller than a total reactance component of the total impedance which is a sum of the impedance of the antenna 22, the impedance of the switching element in the form of the diode D2 and the impedance of the impedance element in the form of the coil L1. The antenna 22 may be of any type such as the circular-polarization complex line loop antenna, plane antenna, inductive antenna, capacitive antenna and bent monopole antenna, as long as the requirements indicated above are satisfied. It is also possible to use an antenna device which consists of a plurality of antennas connected in parallel with each other as shown in FIG. 15, and which has a low input impedance.

There will be explained a change in the admittance (Y), referring to the complex planes of FIGS. 6-8. In the following description, the impedance of the antenna 22 is represented by Za, and the impedance of the coil L1 is represented by Zl, while the impedance of the diode D2 is represented by Zd. The total impedance, which is represented by Z, is expressed as: Z=Za+Zl+Zd. The admittance, which is a reciprocal of the impedance, is expressed as: Y=1/Z. In the complex planes of FIGS. 6-8, the imaginary part is taken along a vertical axis Im, while the real part is taken along a horizontal axis Re.

Figure 6:
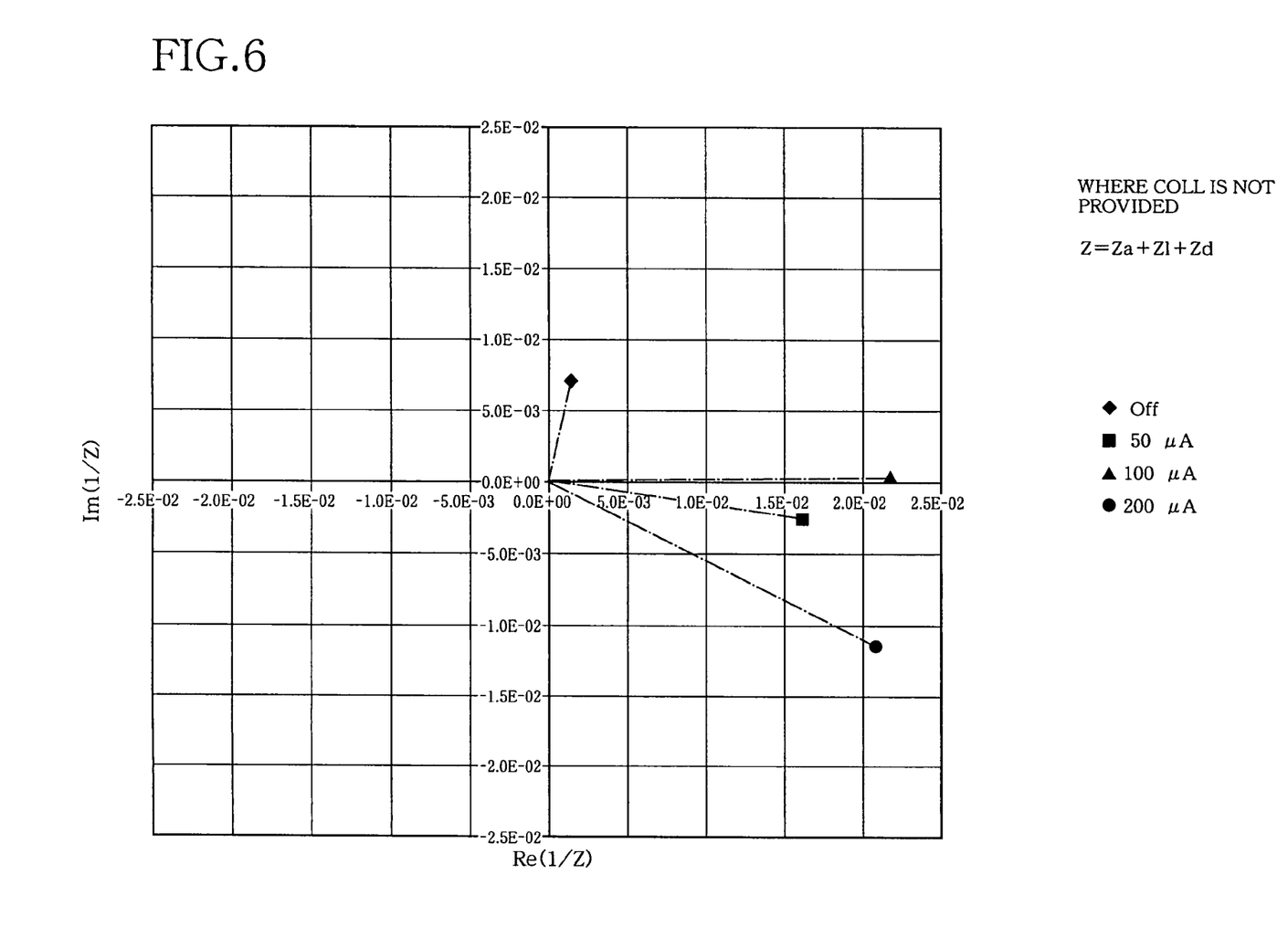
FIG. 6 is a view indicating a change in the admittance of the transponder 20 in a complex plane, where the transponder 20 is not provided with a coil L.

FIG. 6 is a view of plotting of the admittance values in the complex plane, when the electric current applied to the diode D2 is 0 μA, 50 μA, 100 μA and 200 μA are plotted, where the coil L1 is not provided. FIG. 7 is a view of plotting of the admittance values in the complex plane, when the electric current applied to the diode D2 is 0 μA, 50 μA, 100 μA and 200 μA are plotted, where the coil L1 having an inductance value L of 5.6 nH is provided. FIG. 8 is a view of plotting of the admittance values in the complex plane, when the electric current applied to the diode D2 is 0 μA, 50 μA, 100 μA and 200 μA are plotted, where the coil L1 having an inductance value L of 10 nH is provided.

Figure 7:
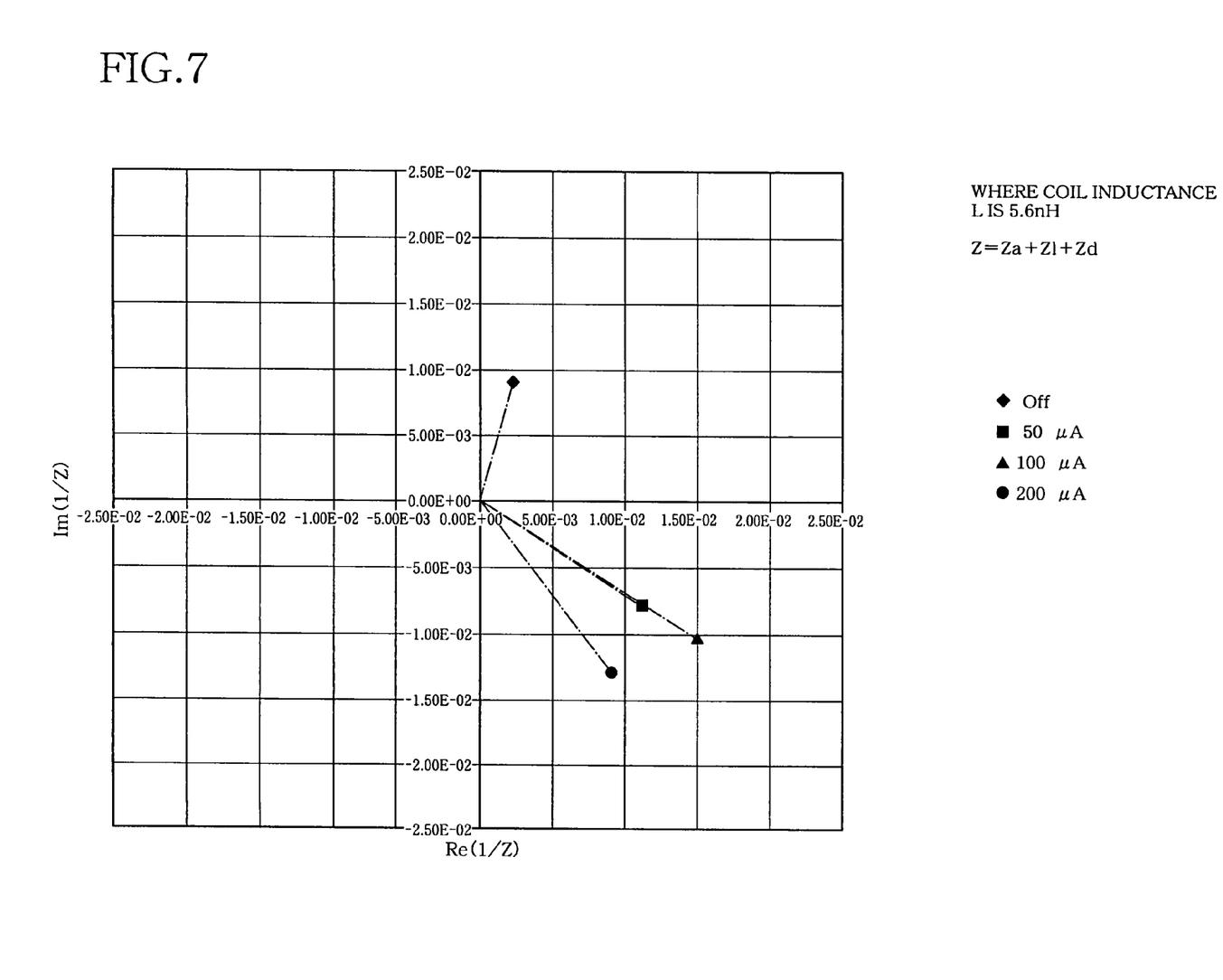
FIG. 7 is a view indicating a change in the admittance of the transponder 20 in a complex plane, where the transponder 20 is provided with a coil L of 5.6 nH.
Figure 8:
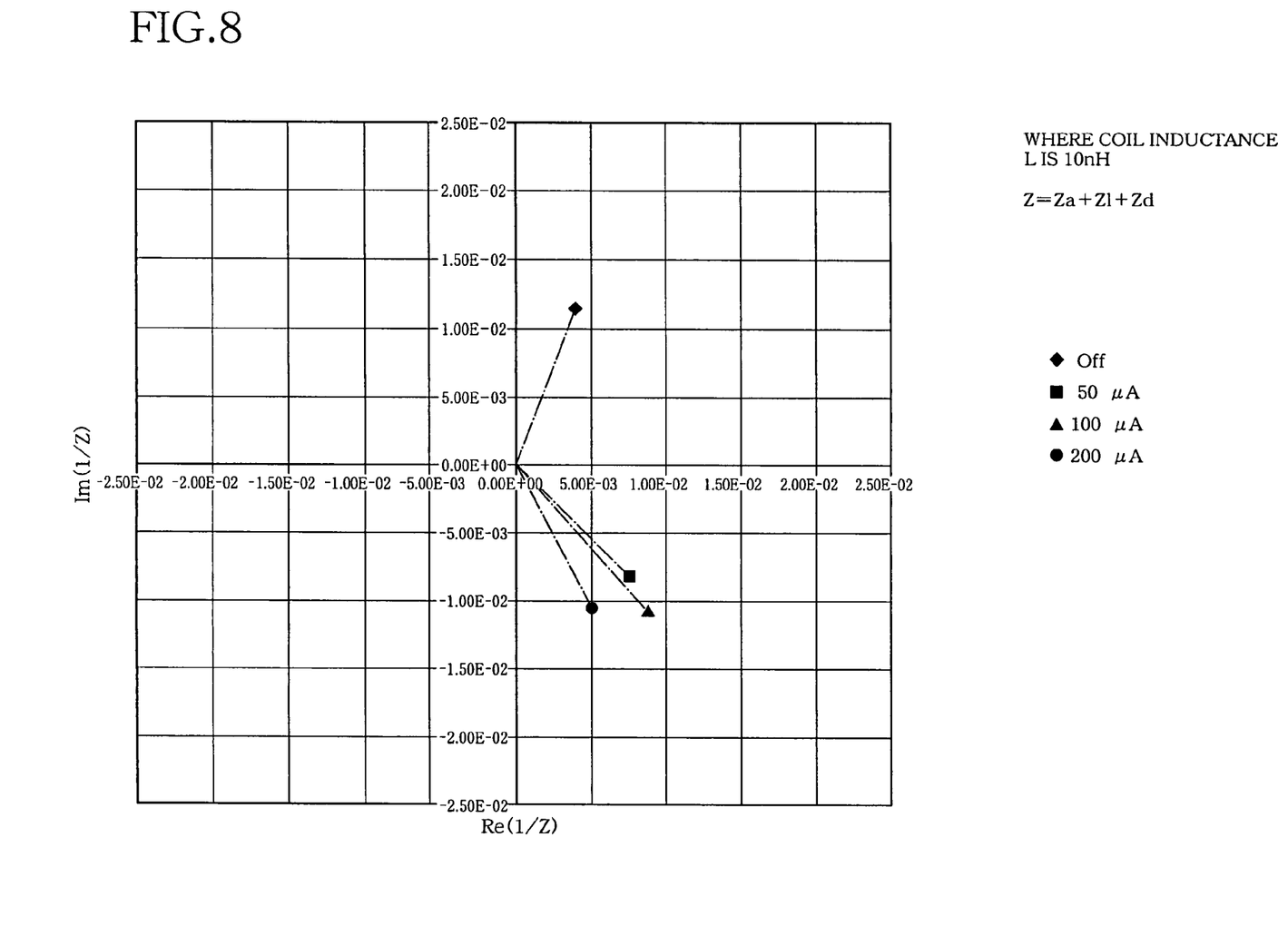
FIG. 8 is a view indicating a change in the admittance of the transponder 20 in a complex plane, where the transponder 20 is provided with a coil L of 10 nH.

In the complex planes of FIGS. 6-8, a diamond mark, a square mark, a triangular mark and a circular mark represent the admittance values when the electric current applied to the diode D2 is 0 μA, 50 μA, 100 μA and 200 μA, respectively. A distance from the center of each complex plane of FIGS. 6-8 to each of the marks represents an amplitude ratio of the reflected wave. Further, an angle between a straight line connecting the center of the complex plane and the diamond mark (representing the admittance when the applied electric current is 0 μA) and a straight line connecting the center and each of the other marks (square, triangular, and circular marks) represents a phase difference. Described more specifically, the angle between the straight line connecting the center of the complex plane and the diamond mark and the straight line connecting the center and the square marks (when the electric current applied to the diode D2 is 50 μA) represents a difference between the phase when the electric current applied to the diode D2 is 0 μA and the phase when the electric current applied to the diode D2 is 50 μA. The angle between the straight line connecting the center of the complex plane and the diamond mark and the straight line connecting the center and the triangular mark (when the electric current applied to the diode D2 is 100 μA) represents a difference between the phase when the electric current applied to the diode D2 is 0 μA and the phase when the electric current applied to the diode D2 is 100 μA.

In the case shown in FIG. 6 wherein the coil L1 is not provided, the phase difference is 88 degrees when the electric current applied to the diode D2 is 0 μA and 50 μA, 83 degrees when the electric current applied to the diode D2 is 0 μA and 100 μA, and 105 degrees when the electric current applied to the diode D2 is 0 μA and 200 μA.

In the case shown in FIG. 7 wherein the coil L1 the inductance L of which is 5.6 nH, the phase difference is 107 degrees when the electric current applied to the diode D2 is 0 μA and 50 μA, 111 degrees when the electric current applied to the diode D2 is 0 μA and 100 μA, and 130 degrees when the electric current applied to the diode D2 is 0 μA and 200 μA.

In the case shown in FIG. 8 wherein the coil L1 the inductance L of which is 10 nH, the phase difference is 115 degrees when the electric current applied to the diode D2 is 0 μA and 50 μA, 122 degrees when the electric current applied to the diode D2 is 0 μA and 100 μA, and 135 degrees when the electric current applied to the diode D2 is 0 μA and 200 μA.

Figure 5:
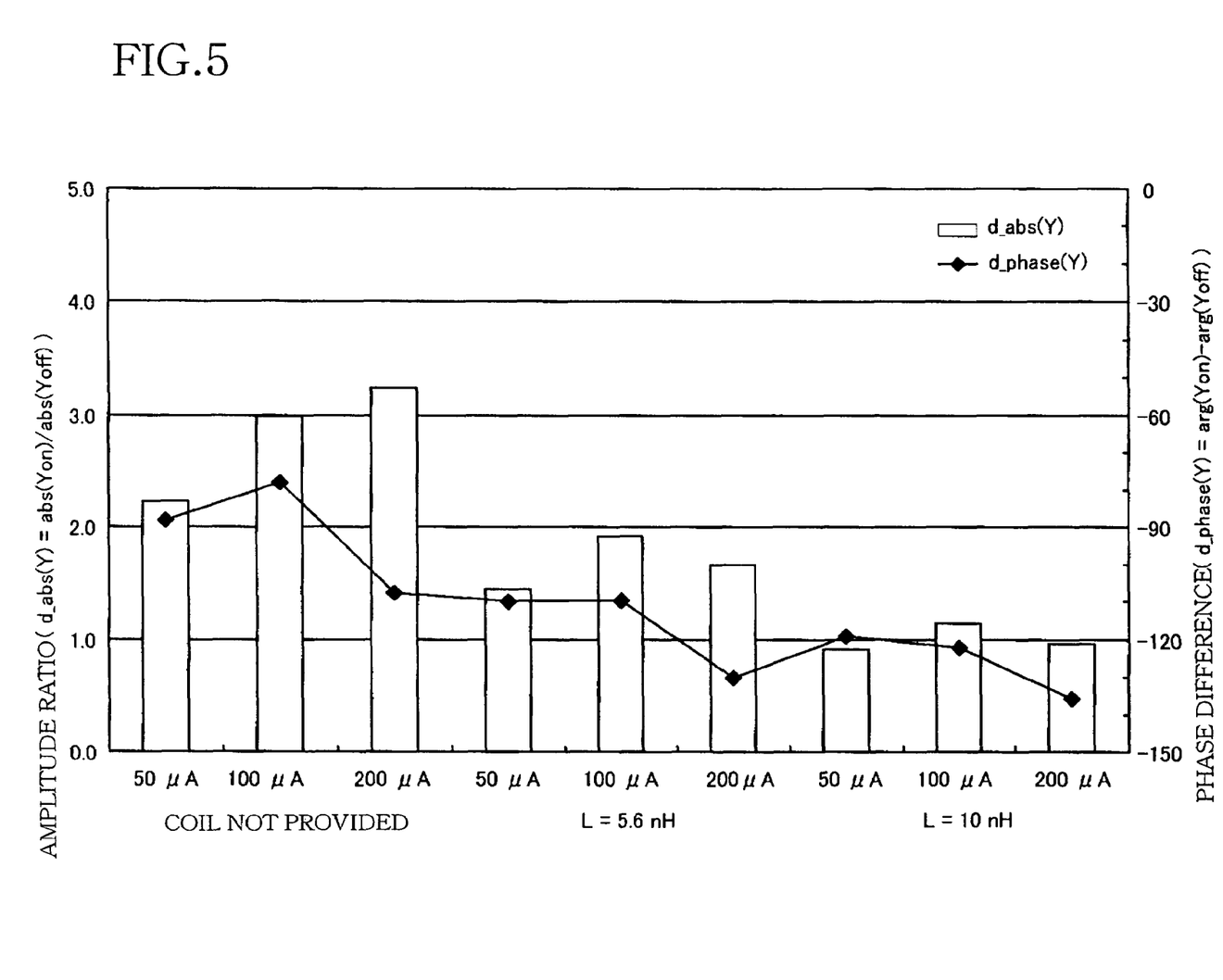
FIG. 5 is a graph indicating a change in the admittance of the transponder 20.

Referring next to FIG. 5, there will be explained the amplitude ratio and phase. difference values calculated from the admittance values obtained in the present embodiment. FIG. 5 is a graph indicating the amplitude and phase difference values calculated from the admittance values indicated in FIGS. 6-8. Described in detail, the graph of FIG. 5 indicates the amplitude and phase difference values of the reflected waves generated by the transponder 20 when the electric current applied to the diode D2 is 50 μA, 100 μA and 200 μA in each of the case where the coil L1 is not provided, the case where the coil L1 having the inductance of 5.6 nH is provided, and the case where the coil L1 having the inductance of 10 nH is provided. The amplitude ratio and the phase difference are taken along the vertical axis, on the respective left and right sides of the graph of FIG. 5. A bar graph indicates the calculated amplitude ratio values, while a line graph indicates the phase difference values.

It will be understood from FIG. 5 that where the coil L1 is not provided, the amplitude ratio is 2.2 and the phase difference is −88 degrees (absolute value of 88 degrees), when the electric current applied to the diode D2 is 50 μA, while the amplitude ratio is 3.0 and the phase difference is −83 degrees (absolute value of 83 degrees), when the applied electric current is 100 µA. The amplitude ratio is 3.2 and the phase difference is −105 degrees (absolute value of 105 degrees), when the applied electric current is 200 µA.

It will also understood from FIG. 5 that where the coil L1 has the inductance L of 5.6 nH, the amplitude ratio is 1.4 and the phase difference is −107 degrees (absolute value of 107 degrees), when the electric current applied to the diode D2 is 50 µA, while the amplitude ratio is 1.9 and the phase difference is −111 degrees (absolute value of 111 degrees), when the applied electric current is 100 µA. The amplitude ratio is 1.7 and the phase difference is −130 degrees (absolute value of 130 degrees), when the applied electric current is 200 µA.

It will also be understood from FIG. 5 that where the coil L1 has the inductance L of 10 nH, the amplitude ratio is 0.9 and the phase difference is −115 degrees (absolute value of 115 degrees), when the electric current applied to the diode D2 is 50 µA, while the amplitude ratio is 1.1 and the phase difference is −122 degrees (absolute value of 122 degrees), when the applied electric current is 100 µA. The amplitude ratio is 1.96 and the phase difference is −135 degrees (absolute value of 135 degrees), when the applied electric current is 200 µA.

Figure 9:
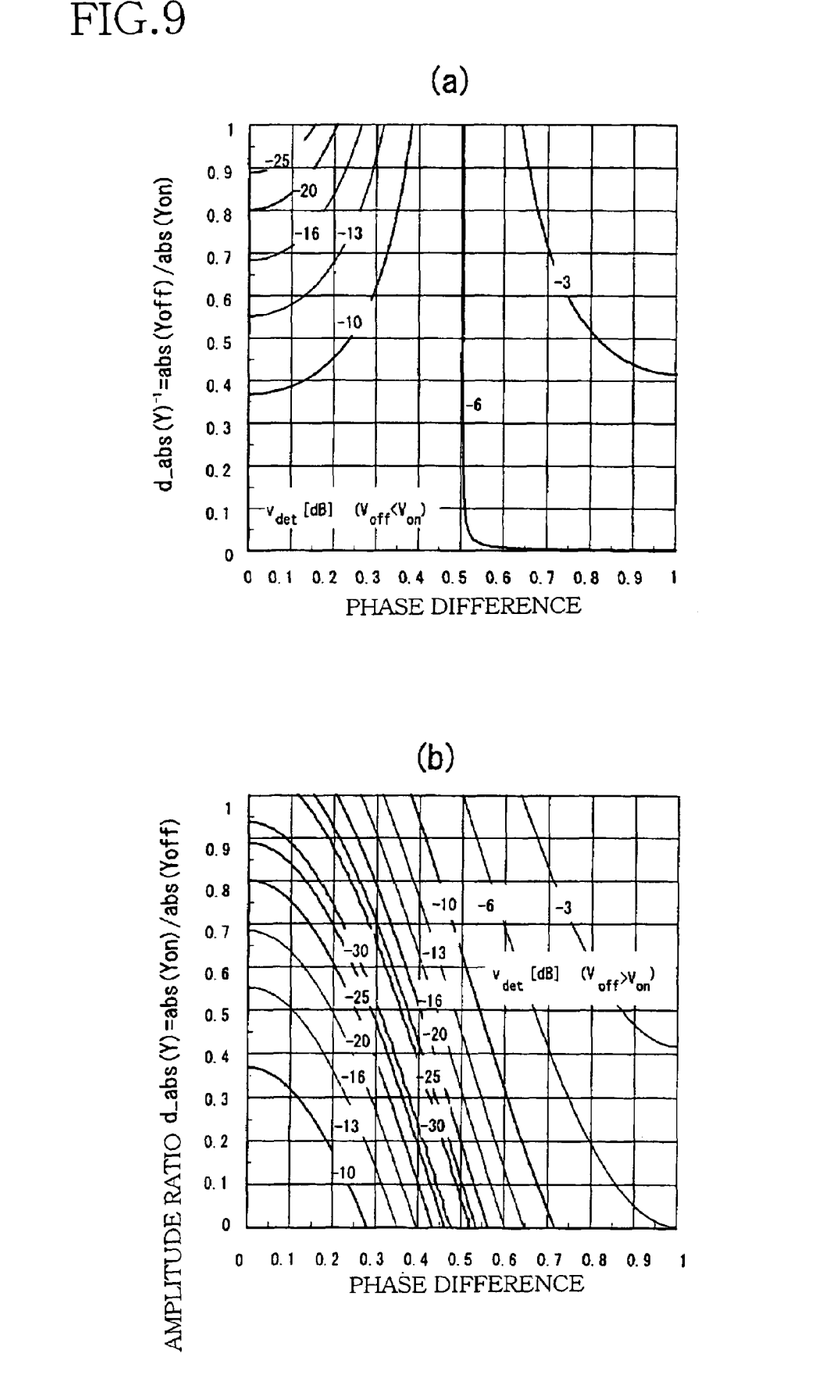
FIG. 9(a) is a graph indicating a relationship between an amplitude ratio and a phase difference of a reflected wave when an switching element is in an on state.
FIG. 9(b) is a graph indicating a relationship between the amplitude ratio and phase difference of the reflected wave when the switching element is in an off state.
Figure 10:
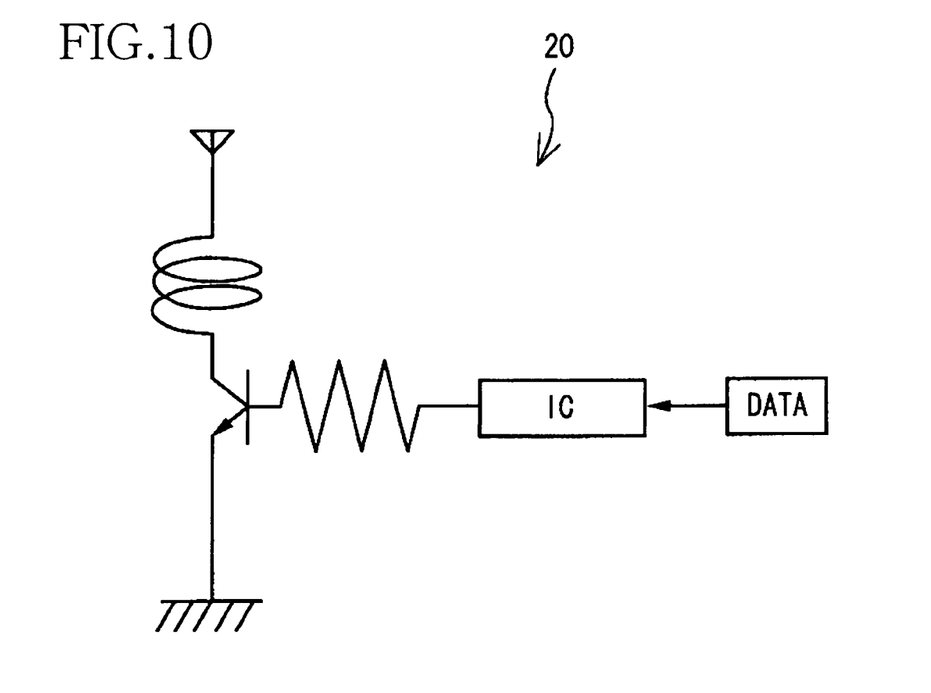
FIG. 10 is a circuit diagram showing an example of the transponder 20 which includes a switching element in the form of a transistor.

FIGS. 9(a) and 9(b) show amounts of reduction of the detected signal level of the reflected wave upon phase demodulation where there exists a difference between the amplitude of the reflected wave when the switching element is placed in the on state and that when the switching element is placed in the off state. In these figures, the amplitude difference is taken along the vertical axis, and the phase difference of the reflected wave is taken along the horizontal axis. The amplitude difference is represented by a ratio of the amplitude when the switching element is in the off state, to that when the switching element is in the on state. Lines in the graphs indicate the amounts of reduction of the detected signal level in decibel (dB). FIG. 9(a) is the graph when the amplitude when the switching element is in the on state is larger than that when the switching element is in the off state, and FIG. 9(b) is the graph when the amplitude when the switching element is in the on state is smaller than that when the switching element is in the off state. In both of these two cases of FIGS. 9(a) and 9(b), the phase when the switching element is in the off state is advanced with respect to that in the on state. It will be understood from the graphs that the amount of reduction of the detected signal level is reduced to within about −6 dB, where the amplitude ratio is close to "1" (where the amplitude difference is small), and when the absolute value of the phase difference is not smaller than 90 degrees (0.5π radian). It will also be understood from the graphs that the detected signal level is reduced at a high rate when the absolute value of the phase difference is smaller than 90 degrees.

Upon phase demodulation of the reflected wave by the interrogator 10, therefore, it is desirable that the amplitude ratio of the reflected wave is close to "1". Since it is desirable to increase the phase difference for increasing the modulation factor, it is preferable to provide the transponder with the coil L1 serving as an impedance element. The inductance L of the coil L1 is preferably 5.6 nH since this coil L1 permits the amplitude ratio to be close to "1", and permits the phase difference to be comparatively large, and is more preferably 10 nH since this coil L1 permits the amplitude ratio to be closer to "1" and permits the phase difference to be larger.

In the communication system 1 constructed as described above, the inductance L of the additional impedance element in the form of the coil L1 is determined while taking into account the impedance of the antenna 22 and the impedance of the diode D2 in the transponder 20, and this additional impedance element is connected to the base of the antenna 22, so that the phase variation can be made larger and the amplitude variation can be made smaller than in the case where the additional impedance element (coil L1) is not provided. Accordingly, the circuit arrangement of the transponder 20 can be simplified, and the modulation factor of the reflected wave can be increased, thereby permitting increased stability of communication.

It will be understood from the foregoing description that the transponder according to claim 1 receives through its antenna the main carrier transmitted from the interrogator, and effects a predetermined modulation of the main carrier by changing the impedance of the circuit connected to the antenna, as viewed from the antenna, to generate a reflected wave for responding to the interrogator. In this transponder, the above-indicated circuit is provided with the switching element operable to modulate the main carrier received by the antenna, and the impedance element connected to the switching element, and the impedance element has an impedance determined so as to provide a predetermined difference between a phase of a total impedance which is a sum of an input impedance of the antenna and an impedance of the circuit, at a frequency of the main carrier, when the switching element is in an on state, and that when the switching element is in an off state. Thus, the amount of phase variation of the reflected wave when the switching element is in the on state with respect to the phase when the switching element is in the off state can be determined, so that the transponder can be given a high modulation factor for stable communication.

The transponder of the communication system according to claim 2 has not only the advantage of the arrangement according to claim 1, but also an advantage that an amount of an electric current to be applied to the switching element is determined such that an absolute value of the total impedance of the input impedance of the antenna and the impedance of the circuit connected to the antenna at the frequency of the main carrier when the switching element is in the on state is substantially equal to that when the switching element is in the off state, so that the amplitude-modulated component when the switching element is turned on and off can be reduced to minimize an amount of reduction of a detected signal level of the reflected wave due to the amplitude-modulated component, upon demodulation of the reflected wave by the interrogator.

The transponder of the communication system according to claim 3 has the advantage of the arrangement according to claim 1 or 2, but also an advantage that the antenna has an impedance including a resistance component which is smaller than a total reactance component of the total impedance of the input impedance of the antenna and the impedance of the above-indicated circuit at the frequency of the main carrier, so that an amount of phase variation of the reflected wave can be increased.

The transponder of the communication system according to the third preferred form of the invention described above has an additional advantage that the impedance of the impedance element is determined so as to provide a difference of 90 degrees or higher between the phase of the total impedance of the input impedance of the antenna and the impedance of the above-indicated circuit at the frequency of the main carrier when the switching element is in the on state, and that when the switching element is in the off state. Accordingly, the amount of phase variation of the reflected wave can be made 90 degrees or higher, and the modulation factor can be increased for stable communication.

The transponder of the communication system according to the fifth preferred form of the invention described above an additional advantage that an amount of an electric current to be applied to the impedance element and the diode is determined so as to provide a difference of 90 degrees or higher between the phase of the total impedance of the input impedance of the antenna and the impedance of the circuit at the frequency of the main carrier when the electric current is applied to the diode and that when the electric current is not applied to the diode, so that the amount of variation of the phase of the reflected wave when the electric current is applied to the diode with respect to the phase when the electric current is not applied to the diode can be made 90 degrees or higher, and the modulation factor can be increased for stable communication.

The transponder of the communication system according to the sixth preferred form of the invention described above has an additional advantage that an amount of an electric current to be applied to the impedance element and the diode is determined so as to maximize a difference between the phase of the total impedance of the input impedance of the antenna and the impedance of the circuit at the frequency of the main carrier when the electric current is applied to the diode and that when the electric current is not applied to the diode, so that the amount of variation of the phase of the reflected wave when the electric current is applied to the diode with respect to the phase when the electric current is not applied to the diode can be made 90 degrees or higher, and the modulation factor can be increased for stable communication.

The invention claimed is:

1. A transponder for communication with an interrogator which transmits a main carrier, the transponder comprising (a) an antenna which receives the main carrier, and (b) a circuit connected to the antenna, the transponder effecting a predetermined modulation of the main carrier by changing an impedance of the circuit, as viewed from the antenna, to generate a reflected wave for responding to the interrogator, wherein:

the circuit includes a switching element operable to modulate the main carrier received by the antenna from said interrogator, and an impedance element connected to the switching element; and the impedance element has an impedance determined so as to provide a difference of 90 degrees or higher between a phase of a total impedance which is a sum of an input impedance of the antenna and an impedance of the circuit, at a frequency of the main carrier, when the switching element is in an on state, and that when the switching element is in an off state, wherein an amount of an electric current to be applied to the switching element is determined such that an absolute value of the total impedance of the input impedance of the antenna and the impedance of the circuit at the frequency of the main carrier when the switching element is in the on state is substantially equal to that when the switching element is in the off state.

2. The transponder according to claim 1, wherein the antenna has an impedance including a resistance component which is smaller than a total reactance component of the total impedance of the input impedance of the antenna and the impedance of the circuit at the frequency of the main carrier.

3. The transponder according to claim 1, wherein the impedance of the impedance element is determined so as to maximize a difference between the phase of the total impedance of the input impedance of the antenna and the impedance of the circuit at the frequency of the main carrier when the switching element is in the on state, and that when the switching element is in the off state.

4. The transponder according to claim 1, wherein the switching element includes a diode, and an amount of an electric current to be applied to the impedance element and the diode is determined so as to provide the difference of 90 degrees or higher between the phase of the total impedance of the input impedance of the antenna and the impedance of the circuit at the frequency of the main carrier when the electric current is applied to the diode and that when the electric current is not applied to the diode.

5. The transponder according to claim 1, wherein the switching element includes a diode, and an amount of an electric current to be applied to the impedance element and the diode is determined so as to maximize a difference between the phase of the total impedance of the input impedance of the antenna and the impedance of the circuit at the frequency of the main carrier when the electric current is applied to the diode and that when the electric current is not applied to the diode.

6. The transponder according to claim 1, wherein the switching element includes a transistor.

7. The transponder according to claim 1, wherein the switching element includes a field-effect transistor.

8. The transponder according to claim 1, wherein the impedance element includes a coil.

9. The transponder according to claim 1, wherein the impedance element includes a capacitive load.

10. The transponder according to claim 1, wherein the impedance element includes a distributed-constant circuit having a stub.

11. The transponder according to claim 1, wherein the impedance element includes a combination of a coil and a capacitive load.

12. A communication system including an interrogator operable to transmit a main carrier, and a plurality of transponders each of which is constructed according to claim 1.

* * * * *

UNITED STATES PATENT AND TRADEMARK OFFICE
CERTIFICATE OF CORRECTION

| | |
|---|---|
| PATENT NO. | : 7,528,699 B2 |
| APPLICATION NO. | : 11/032197 |
| DATED | : May 5, 2009 |
| INVENTOR(S) | : Takuya Nagai |

Page 1 of 1

It is certified that error appears in the above-identified patent and that said Letters Patent is hereby corrected as shown below:

Title page, item (73) Assignee: should read as follows: Brother Kogyo Kabushiki Kaisha, Nagoya (JP)

Signed and Sealed this

Twenty-fifth Day of May, 2010

David J. Kappos
*Director of the United States Patent and Trademark Office*